US006228504B1

(12) United States Patent
Sawada et al.

(10) Patent No.: US 6,228,504 B1
(45) Date of Patent: *May 8, 2001

(54) ADHESIVE RESIN COMPOSITION

(75) Inventors: Yuji Sawada; Kouji Kitahara, both of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/082,119

(22) Filed: May 20, 1998

(30) Foreign Application Priority Data

May 20, 1997 (JP) .................................... 9-130156

(51) Int. Cl.⁷ ............................ C08L 29/04; B32B 27/08
(52) U.S. Cl. .................... 428/515; 428/516; 524/504; 524/505; 524/524
(58) Field of Search ..................... 524/504, 505, 524/524; 428/515, 516

(56) References Cited

U.S. PATENT DOCUMENTS 5,252,393 * 10/1993 Kagota et al. ...................... 524/271

FOREIGN PATENT DOCUMENTS

0188901A2 7/1986 (EP) .
0412503A2 2/1991 (EP) .
2677658A1 12/1992 (FR) .

* cited by examiner

Primary Examiner—Peter D. Mulcahy
(74) Attorney, Agent, or Firm—Birch, Stewart, Kolasch & Birch, LLP

(57) ABSTRACT

The adhesive resin composition of this invention comprises (A) 30 to 70 parts by weight of an ethylene/vinyl acetate copolymer, (B) 0 to 50 parts by weight of an ethylene/α-olefin copolymer having an ethylene content of 30 to 95 mole % and a degree of crystallinity by X-ray of not higher than 40%, (C) 0 to 50 parts by weight of a modified ethylene/α-olefin copolymer having an ethylene content of 30 to 95 mole % and a degree of crystallinity by X-ray of not higher than 40%, (D) 0 to 30 parts by weight of modified polyethylene, (E) 1 to 20 parts by weight of a tackifier and (F) 1 to 20 parts by weight of a styrene polymer, characterized in that (B)+(C)=15 to 60 parts by weight, (C)+(D)≧2 parts by weight, and (A)/[(B)+(C)]=0.5 to 3. This composition has excellent adhesion to the styrene resin or a saponified product of the ethylene/vinyl acetate copolymer, and a laminated body of these resins using this composition as an adhesive layer has excellent post-processability.

9 Claims, No Drawings

ADHESIVE RESIN COMPOSITION

BACKGROUND OF THE INVENTION

1. (Field of the Invention)

This invention relates to an adhesive composition suitable for the production of a multilayered laminated body, and a laminated body using the above-mentioned adhesive composition.

More specifically, the present invention relates to a composition having excellent adhesiveness to a styrene-type resin layer and a layer of a saponified product of ethylene/vinyl acetate copolymer, and a laminated body equipped with a styrene-type resin layer, an adhesive composition layer, and a layer of a saponified product of ethylene/vinyl acetate copolymer.

2. (Description of the Prior Art)

Since a saponified product of an olefin/vinyl acetate copolymer (to be abbreviated as EVOH) typified by a saponified product of ethylene/vinyl acetate copolymer has excellent gas-barrier property, oil resistance and mechanical strength, but has high water permeability, it has a defect of being unable to be used singly as a food wrapping film or a molded container in which water is contained.

As a method of improving this defect, it has been proposed to laminate a styrene-type resin (to be abbreviated as PS) or a polyolefin-type resin having excellent water resistance. But since these resins do not contain a polar group, even when EVOH is directly laminated on the above resins, an interlayer adhesive force is very small and the resulting product cannot withstand practical use.

Various methods are available to improve the above defects. For example, methods of using a composition comprising an ethylene/vinyl acetate copolymer (to be abbreviated as EVA) and a tackifier are known (Japanese Laid-Open Patent Publication No. 129271/1978, Japanese Laid-Open Patent Publication No. 147733/1978, and Japanese Laid-Open Patent Publication No. 10384/1979).

Furthermore, Japanese Patent Publication No. 67813/1988 discloses a composition comprising an ethylene/vinyl acetate copolymer, a modified polyolefin copolymer, and a tackifier.

Japanese Laid-Open Patent Publication No. 72931/1993 discloses a composition comprising an ethylene/α-olefin copolymer, a modified polyolefin copolymer and a tackifier.

However, in the field of adhesives, a further increase of adhesive force is required between a styrene-type resin and a saponified layer of an ethylene/vinyl acetate copolymer, and an increase in after-processability of an adhered laminated body is also required. The after-processability of the adhered laminated body means that when the laminated body is molded into a cup or a tray, an excellent adhesive force should be maintained, and when cutting is carried out, the cut portion can be cut sharply without threading or peeling.

Conventional adhesive compositions may exhibit excellent properties, but are not satisfactory in such a requirement.

SUMMARY OF THE INVENTION

The present inventors have extensively made investigations, and found that an adhesive composition comprising an ethylene/vinyl acetate copolymer, a modified ethylene/α-olefin copolymer having a degree of crystallinity of not greater than 40%, a tackifier, and a styrene-type polymer meets the above requirement. This finding has led to the present invention.

It is an object of this invention to provide an excellent adhesive composition which has excellent adhesiveness to a styrene-type resin layer and a saponified layer of an ethylene/vinyl acetate copolymer, and also has excellent after-processability.

Another object of this invention is to provide a laminated body equipped with a styrene-type resin layer, an adhesive composition, and a saponified layer of an ethylene/vinyl acetate copolymer and a laminated body having excelllent interlayer adhesiveness and after-processability.

According to this invention, there is provided an adhesive resin composition comprising:

(A) 30 to 70 parts by weight of an ethylene/vinyl acetate copolymer, (B) 0 to 50 parts by weight of an ethylene/α-olefin copolymer having an ethylene content of 30 to 95 mole % and a degree of crystallinity by X-ray of not higher than 40%, (C) 0 to 50 parts by weight of a modified ethylene/α-olefin copolymer having an ethylene content of 30 to 95 mole % and a degree of crystallinity of not higher than 40% by X-ray, (D) 0 to 30 parts by weight of modified polyethylene, (E) 1 to 20 parts by weight of a tackifier, and (F) 1 to 20 parts by weight of a styrene polymer, wherein (B)+(C)=15 to 60%, (C)+(D)$\geq$2% by weight, and (A)/[(B)+(C)]=0.5 to 3.

According to this invention, there is a laminated body in which the layer composed of the adhesive resin composition is formed between a styrene-resin layer and a saponified layer of an ethylene/vinyl acetate copolymer.

DETAILED DESCRIPTION OF THE INVENTION

The adhesive composition of this invention is prepared from (A) to (F), but is characterized in that the ethylene/vinyl acetate copolymer, a modified or unmodified lowly crystalline ethylene/α-olefin copolymer, a modified polyethylene, a tackifier and a styrene-resin layer are combined in specified proportions. As a result, the adhesiveness to the styrene-type resin and the saponified layer of an ethylene/vinyl acetate copolymer can be markedly increased, and in addition, the after-processability of the laminated body formed can be improved.

Compounded Components (A) Ethylene/vinyl acetate copolymer

The ethylene/vinyl acetate copolymer used in this invention is a known ethylene/vinyl acetate copolymer (EVA). Usually, this ethylene/vinyl acetate copolymer has a melt flow rate [MFR(E): ASTM D 1238.E] of 0.1 to 50 g/10 minutes, preferably 1 to 30 g/10 minutes, and a vinyl acetate content of 5 to 50% by weight, preferably 15 to 40% by weight, especially preferably 20 to 30% by weight. By using this ethylene/vinyl acetate copolymer, there can be obtained an adhesive resin composition having excellent extrusion moldability and adhesiveness.

(B) Ethylene/α-olefin copolymer

The ethylene/α-olefin copolymer (B) used in this invention is a random copolymer of ethylene and an α-olefin having the following characteristics.

Melt flow rate [MFR (E): ASTM D 1238 .E]: 0.1 to 50 g/10 minutes, preferably 0.3 to 30 g/10 minutes.

Density: 0.850 to 0.900 g/cm³, preferably 0.850 to 0.890 g/cm³.

Ethylene content: 30 to 95 mole %, preferably 75 to 95 mole %, especially preferably 75 to 90 mole %.

Degree of crystallinity by X-ray: 40% or below, preferably 30% or below, especially preferably less than 25%.

If an ethylene/α-olefin copolymer having the characteristic values within the above ranges is used, an adhesive resin composition having excellent adhesiveness can be obtained.

As the α-olefin constituting such an ethylene/α-olefin copolymer (B), α-olefins containing 3 to 20 carbon atoms may be used. Specific examples of such α-olefins include propylene, 1-butene, 1-hexene, 4-methyl-1-pentene, 1-octene, 1-decene, 1-tetradecene and 1-octadecene. These α-olefins may be used singly or as mixtures of at least two monomers.

Such an ethylene/α-olefin copolymer (B) has a melting point (ASTM D3418) of usually 100° C. or below.

(C) Modified ethylene/α-olefin copolymer

The modified ethylene/α-olefin copolymer (C) used in this invention is obtained by graft-reacting a monomer selected from unsaturated carboxylic acids or derivatives thereof. In the present invention, the graft-modified amount of the unsaturated carboxylic acids or derivatives thereof is usually 0.001 or 10% by weight, preferably 0.01 to 10% by weight, especially preferably 0.1 to 5% by weight, in the graft modified ethylene/α-olefin copolymer.

The unsaturated carboxylic acids or the derivatives thereof may include unsaturated carboxylic acids such as acrylic acid, maleic acid, fumaric acid, tetrahydrophthalic acid, itaconic acid, citraconic acid, crotonic acid, isocrotonic acid, Nadic acid® (endo-cis-bicyclo[2,2,1]hepto-5-ene-2,3-dicarboxylic acid), and the derivatives thereof, for example, acid halides, amides, imides, anhydride, and esters, specifically chlorinated maleanil, maleimide, maleic anhydride, citranonic anhydride, monomethyl maleate, dimethyl maleate and glycicyl maleate. Among them, unsaturated dicarboxylic acids and acid anhydrides thereof are preferred. Especially preferred are maleic acid, Nadic acid® and these acid anhydrides.

Known various methods may be used in order to prepare modified products by graft-copolymerizing the ethylene/α-olefin copolymer with a graft monomer selected from unsaturated carboxylic acids or the derivatives thereof. For example, there are a method comprising melting the ethylene/α-olefin copolymer, adding a graft monomer to the molten copolymer, and then performing graft copolymerization, and a method comprising dissolving a graft monomer in a solvent and performing graft copolymerization. In any case, to perform graft copolymerization of the graft monomer efficiently, and carry out the graft copolymerization, it is preferred to carry out the reaction in the presence of a radical initiator. The graft reaction can be carried out usually at a temperature of 60 to 350° C. The amount used of the radical initiator is usually 0.001 to 1 part by weight per 100 parts by weight of the ethylene/α-olefin copolymer.

Examples of the radical initiator include organic peroxides and organic per-esters such as benzoyl peroxide, dichlorobenzoyl peroxide, dicumyl peroxide, di-tert-butylperoxide, 2,5-dimethyl-2,5-di(peroxidebenzoate) hexyne-3, 1,4-bis(tert-butylperoxyisopropyl)benzene, lauroyl peroxide, tert-butylperacetate, 2,5-dimethyl-2,5-di(tert-butylperoxy)hexyne-3, 2,5-dimethyl-2,5-di(tert-butylperoxy)hexane, tert-butylperbenzoate, tert-butylperphenyl-acetate, tert-butylperisobutylate, tert-butylper-sec-octoate, tert-butylperpivalate, cumylperpivalate, and tert-butylperdiethyldiethylacetate, and other azo compounds such as azobisisobutylonitrile and dimethylazoisobutylate. Of these compounds, dialkylperoxides such as dicumyl peroxide, di-tert-butylperoxide, 2,5-dimethyl-2,5-di(tert-butylperoxy)hexyne-3, 2,5-dimethyl-2,5-di(tert-butylperoxy)hexane, and 1,4-bis(tert-butylperoxyisopropyl)benzene.

(D) Modified polyethylene

The modified polyethylene (D) used in the composition of this invention has a grafted unsaturated carboxylic acid or its derivative in an amount of 0.01 to 10% by weight, preferably 0.1 to 5% by weight, a density of 0.905 to 0.980 g/cm³, preferably 0.920 to 0.970 g/cm³, and a degree of crystallinity by X-ray of at least 45%, preferably 50 to 80%.

When the grafted amount of the unsaturated carboxylic acid is less than 0.01% by weight, the adhesiveness to EVOH is not improved. On the other hand, if the grafted amount of the unsaturated carboxylic acid exceeds 10% by weight, dispersibility is decreased by crosslinking and the adhesiveness to EVOH is decreased.

Polyethylene which becomes a basis of the modified polyethylene (D) used in this invention usually may be a homopolymer of ethylene or a copolymer of ethylene and a small amount of at least one type of an α-olefin, specifically propylene, 1-butene, 4-methyl-1-pentene, 1-hexene, 1-octene or 1-decene having a melt flow rate (MFR: ASTM D 1238, E) of 0.01 to 100 g/10 minutes, a density of 0.905 to 0.980 g/cm³ and a degree of crystallinity by X-ray of at least 45%, and may be distinguished from the ethylene/unsaturated carboxylic acid ester copolymer.

The unsaturated carboxylic acid or its derivative to be grafted onto the polyethylene may be the various compounds mentioned in (C).

Among the above-mentioned compounds, unsaturated dicarboxylic acids or acid anhydrides thereof are preferred. Especially, maleic acid, Nadic acid® or their acid anhydrides are preferred.

To graft-copolymerize a grafting monomer selected from unsaturated carboxylic acids or derivatives thereof with the polyethylene, the various methods mentioned in (C) may be employed.

(E) Tackifier

The tackifiers (E) used in this invention is a material which is used in hot-melt adhesives or wrap films in order to impart adhesiveness, for example, coumarone-indene resins, phenol-terpene resins, petroleum-type hydrocarbon resins, rosin or its derivatives, such as rosin esters and hydrogenated rosin.

Among these materials, the petroleum-type hydrocarbon resins are preferred.

Examples of the petroleum-type hydrocarbon resins include aromatic hydrocarbon resins, alicyclic hydrocarbon resins and aliphatic hydrocarbon resins.

As the tackifiers (E) used in the composition of this invention, the aliphatic hydrocarbon resins and/or alicyclic hydrocarbon resins obtained by hydrogenating aromatic hydrocarbon resins are preferably used.

A method for producing these hydrocarbon resins comprises polymerizing a polymerizable aromatic hydrocarbon such as vinyltoluene, vinylxylene, propenylbenzene, indene, methylindene or ethylindene, or a mixture of at least two such aromatic hydrocarbons, and hydrogenating the resulting resin. Or another method comprises polymerizing a fraction of distillate having a boiling point of 150 to 300° C. which is formed in the decomposition or reforming of petroleum, and hydrogenating the resulting resin. The hydronated product of the aromatic hydrocarbon resin may contain some amount of an aliphatic hydrocarbon. From this fact, the polymerizable aromatic hydrocarbon is used as a main portion and a small amount of an aliphatic hydrocarbon such as butene, pentene, hexene, heptene, octene, butadiene, pentadiene, cyclopentadiene, or dicyclopentadiene is mixed, the mixture is polymerized, and the polymer may be hydrogenated. Since the petroum fraction of the distillate having a boiling point of 20 to 300° C. is a mixture of a large amount of an aromatic hydrocarbon and some amount of an aliphatic hydrocarbon, this fraction may be used as an advantageous starting material.

Polymerization may be carried out by a well known method. Usually, the polymerization is carried out by a cation polymerization in the presence of a Friedel-Crafts catalyst. A method of hydrogenation comprises performing reaction under heat in the presence of a metal catalyst such as nickel, palladium, cobalt, platinum, rutenium or rhodium or in the presence of a metal oxide catalyst under a hydrogen pressure of 50 to 500 kg/cm².

The resulting hydrogenated product has a high hydrogenation onto the aromatic nucleus, and especially, the proportion of an aromatic ring of the hydrocarbon resin to be hydrogenated into a cyclohexyl group is at least 80% and especially the hydrogenated product is a transparent resin having a softening point of 80 to 150° C., especially 110 to 140° C., and a bromine value of not higher than 10, preferably not higher than 9.

(F) Styrene polymer

The styrene polymer used in this invention contains, as a main constituent component, a styrene homopolymer or a copolymer of styrene, a ring substituted styrene or a chain substituted styrene in which the α-position of the unsaturated bond is substituted, such as chlorostyrene, dichlorostyrene, methyl styrene, dimethyl styrene and α-methyl styrene. Examples are styrene homopolymer, high-impact polystyrene, and EPT graft polystyrene.

In this invention, as the styrene polymer, a blocked copolymer composed of a styrene block A and an olefin block B can be used.

As the olefin, conjugated diolefins such as butadiene, and isoprene and α-olefins such as ethylene, propylene and 1-butene may be used. An polymer block obtained by polymerizing a conjugated diolefin may be hydrogenated. Furthermore, so long as the olefin unit is predominant in the block B, the block B may be obtained by copolymerizing butadiene or isoprene and styrene or α-methylstyrene.

In the present invention, the blocked copolymer may be a blocked copolymer elastomer which contain a styrene block in amount of 8 to 55% by weight, preferably 10 to 35% by weight in the blocked copolymer elastomer.

These blocked copolymers are produced and sold under tradenames of Kaliflex TR and Clayton C (Shell Chemical Corporation).

In the present invention, a styrene polymer having a melt flow rate [MFR (C): ASTM D 1238. C] of usually 0.1 to 50 g/10 minutes, preferably 1 to 40 g/10 minutes, is used. If a styrene polymer having an MFR(C) in the above range is used, an adhesive resin composition having excellent extrusion moldability can be obtained.

Adhesive Composition

The present invention provides an adhesive resin composition comprising (A) 30 to 70 parts by weight, preferably 40 to 60 parts by weight, of ethylene/vinyl acetate copolymer, (B) 0 to 50 parts by weight, preferably 5 to 30 parts by weight, especially preferably 10 to 20 parts by weight, of an ethylene/α-olefin copolymer, (C) 0 to 50 parts by weight, preferably 10 to 40 parts by weight, especially preferably 15 to 35 parts by weight, of a modified ethylene/α-olefin copolymer, (D) 0 to 30 parts by weight, preferably 1 to 20 parts by weight, especially preferably 5 to 15 parts by weight, of modified polyethylene instead of the (C) component when the component (C) is not compounded, or together with the componet (C), (E) 1 to 20 parts by weight, preferably 3 to 20 parts by weight, especially preferably 5 to 15% by weight, of a tackifier, and (F) 1 to 20 parts by weight, preferably 2 to 15 parts by weight, especially preferably 3 to 10 parts by weight, of a styrene-type polymer.

In the composition of the present invention, the total amount of the ethylene/α-olefin copolymer as the component (B) and the modified ethylene/α-olefin copolymer as the component (C) should be 15 to 60 parts by weight, preferably 20 to 50 parts by weight, especially preferably 25 to 45 parts by weight.

The total amount of the component (C) and the component (D) should be at least 2 parts by weight, preferably 5 to 40 parts by weight, especially preferably 10 to 30% by weight.

Furthermore, the component (A)/[the total amount of the compoent (B) and the component (C)] should be 0.5 to 3.0, and preferably 0.5 to 2.0.

If the compounded amount of the ethylene/vinyl acetate copolymer (A) is larger than the above range, the adhesive force to EVOH becomes insufficient. If the compounded amount of the ethylene/vinyl acetate copolymer (A) is smaller than the above range, the adhesive force to the styrene resin (PS) becomes insufficient.

If the compounded amount of the ethylene/α-olefin copolymer is larger than the above range, the adhesive force to PS becomes insufficient. If the amount is smaller than the above range, the adhesive force to EVOH becomes insufficient.

If the compounded amount of the modified ethylene/α-olefin copolymer (C) is larger than the above range, cuttability at the time of after-processability (when a cup is molded) of the obtained sheets becomes poor. If the compounded amount of the ethylene/α-olefin copolymer is less than the above range, adhesion to EVOH and PS, specially adhesion to EVOH, becomes insufficient.

If in the composition of this invention, the total amount of the ethylene/α-olefin copolymer as the component (B) and the modified ethylene/α-olefin copolymer as the component (C) is less than 15 parts by weight, the adhesive force to EVOH is insufficient. If the above total amount is larger than 60 parts by weight, the adhesive force to PS becomes insufficient.

If the total amount of the modified polyethylene (D) and the modified ethylene/α-olefin copolymer (C) is less than 2 parts by weight, the adhesive force to EVOH becomes insufficient. On the other hand, if the amount of the modified polyethylene (D) exceeds 30 parts by weight, the adhesive force to PS becomes insufficient.

If the compounded amount of the tackifier (E) is larger than the above range, cuttability during after-processsing is poor. If the compounded amount of the tackifier (E) is less than the above range, the adhesive force to PS is insufficient.

If the compounded amount of the styrene polymer (F) is larger than the above range, the adhesive force to EVOH is insufficient. On the other hand, if the compounded amount of the styrene polymer (F) is less than the above range, the adhesive force to PS and cuttability during after-processing are insufficient.

Furthermore, if the ratio of component (A)/[the total amount of the component (B) and the component (C)] is larger than the above range, the adhesive force to PS is insufficient. If the above ratio is less than the above range, the adhesive force to EVOH and cuttability after processing the sheet are insufficient.

To obtain the composition of this invention, the above-mentioned components (A) to (F) are mixed in the above ranges by various known methods, for example, by using a Henschel mixer, a V blender, a ribbon blender, or a tumbler blender, or after mixing, the above components are molten by using a monoaxial extruder, a biaxial extruder, a neader or a bunbary mixer and kneaded, granulated or pulverized.

In addition to the above components (A) to (F), a heat stabilizer, a weatherability stabilizer, an antistantic agent, a pigment, a dyestuff, and a rust preventing agent may be compounded in the composition of this invention in ranges which do not impair the object of this invention.

Laminated Body

In a laminated structure prepared by using the composition of this invention, the styrene resin (PS) may include polystyrene, impact-resistant polystyrene (rubber-compounded polystyrene), AS resin (SAN), and ABS. The used styrene resin layer may be non-foamed or a foamed body, or may be a laminated body composed of a foamed body formed at an outer surface layer and a non-foamed base body. The expansion factor of the foamed body may be variously changed, but generally, it may be adjusted to 1.05 to 70 times. The styrene resin should have a molecular weight sufficient to form a film.

In the laminated structure using the composition of this invention, a saponified layer of the olefin/vinyl acetate copolymer (EVOH) may be obtained by using an olefin/vinyl acetate copolymer having an olefin content of 15 to 60 mole %, preferably 25 to 50 mole %, and saponifying the above copolymer until a degree of saponification of the copolymer becomes at least 50%, preferably at least 90%.

If the olefin content is less than 15 mole %, the copolymer tends to be easily decomposed by heat, is difficult to be melt molded, has inferior stretchability, easily absorbs water to inflate, and has inferior water resistance. If the olefin content exceeds 60 mole %, the copolymer has inferior gas permeability resistance. Furthermore, if the olefin content is less than 50%, the copolymer has inferior gas permeability resistance.

Specific examples of the olefin to be copolymerized include ethylene, propylene, 1-butene, 1-hexene, 4-methyl-1-pentene, 1-octene, 1-decene, 1-tetradecene and 1-octadecene. In view of the mechanical strength and the moldability, a copolymer with ethylene is preferred.

The used saponification product of the ethylene/vinyl acetate copolymer should have a molecular weight sufficient to form a film.

The laminated body of this invention may have any desired layer construction so long as it is equipped with a styrene resin layer, a layer of a saponified product of ethylene/vinyl acetate copolymer, and an adhesive composition layer between the above two layers. For example, the laminated body may be formed of only the above-mentioned three layers, or may have another resin layer.

The other resin layer may, for example, be an olefin resin. Examples of the olefin resin include low-, medium- or high-density polyethylene, isotactic polypropylene, syndiotactic polypropylene, linear low density polyethylene, ethylene/propylene copolymer, polybutene-1, ethylene-butene-1 copolymer, propylene-butene-1 copolymer, ethylene-propylene-butene-1 copolymer, ethylene/vinyl acetate copolymer, ionically crosslinked olefinic copolymers (ionomers), and ethylene-acrylate copolymers. These olefinic resins are especially suitable as an innner surface material of wrapping laminated bodies. Since the adhesive composition of this invention shows excellent adhesiveness to not only the styrene-type resin and the saponified product of ethylene/vinyl acetate copolymer, but also the olfefinic resins. The production of the above laminated body is also easy.

Examples of layer constructions of the laminated bodies are three kinds-three layers composed of PS/AD/EVOH, three kinds-five layers composed of PS/AD/EVOH/AD/PS, and four kinds-five layers composed of PS/AD/EVOH/AD/PO wherein AD represents an adhesive composition and PO represents an olefin-type resin. Of course, the layer construction is not limited to these examples.

The thicknesses of the layers of the laminated structure of this invention are that PS has a thickness of 0.02 to 5 mm, EVOH has a thickness of 0.01 to 1 mm, and the adhesive layer has a thickness of 0.01 to 1 mm. When an olefin resin layer is used, its thickness should desirably be 0.01 to 2 mm.

The production of a laminated structure composed of PS and EVOH by using the composition of this invention comprises using extruders having a number according to the kinds of resins, melting and kneading the resins in the corresponding extruders, and performing co-extruding-molding the resins by using multilayered multiple dies. Or the PS layer and the EVOH layer are molded in advance, and the adhesive composition is melted and extruded between the PS layer and the EVOH layer (the so-called sandwich laminating method). Among them, it is preferred to use the co-extruding-molding method in view of the interlayer adhesiveness. As the co-extruding-molding method, there are a T-die method using a flat die and an inflation method using a circular die. The flat die may be a single manifold type using a black box, or a multi-manifold type. As the die used in the inflation method, a known die may be used.

Among the laminated bodies of this invention, sheet-like bodies may be formed into cup-like or tray-like containers by vaccum forming, pressure forming, or plug assist molding. Furthermore, by hollow molding a parison extruded through a circular die, a container such as a bottole, a tank and a tube can be produced.

Examples

The present invention will be illustrated in details by following Examples, but it should be understood that this invention should not be restricted by the Examples so long as the present invention does not exceed its essential features.

The resins used in these Examples are as follows:

Ethylene/vinyl acetate copolymer (EVA); vinyl acetate (VA) content of 26% by weight, a density of 0.94 g/cm$^3$, and an MFR of 2.0 g/10 minutes.

Ethylene/propylene copolymer (EPR); an ethylene content of 81 mole %, a density of 0.88 g/cm$^3$, an MFR of 0.4 g/10 minutes, and a degree of crystallinity of 5%.

Maleic anhydride-grafted ethylene/propylene copolymer (MAHEPR); an ethylene content of 81 mole %, a density of 0.88 g/cm³, an MFR of 0.4 g/10 minutes, a degree of crystallinity of 5%, a grafting ratio of 1.0 g/100 g polymer.

Maleic anhydride-grafted linear low density polyethylene (ethylene/1-butene copolymer) (MAHLL); a density of 0.92 g/cm³, an MFR of 0.3 g/10 minutes, a grafting ratio of 0.8 g/100 g polymer.

Alicyclic hydrogenated petroleum resin: (TACK); a tradename Alcon P125; a softening point of 125° C., a bromine value of 2, produced by Arakawa Chemical Co., Ltd.

Syrene resin (PS); tradename OE733 PS/PE alloy produced by BP Chemicals, Co., Ltd.

Examples 1 to 5

The above-mentioned resins were mixed by a Henschel mixer, and the mixture was kneaded and granulated by a 40 mm-monoaxial extruder (dulmage screw) to form an adhesive resin composition.

Thereafter, by using high-impact polystyrene (tradename: Toborex H1830-05 produced by Mitsui Toatsu Chemical, Co. Ltd.), an ethylene/vinyl alcohol copolymer (having an MFR of 1.3 g/10 minutes, a density of 1.19 g/cm³), a saponified product of ethylene/vinyl acetate copolymer having an ethylene content of 32 mole % (tradename: Kurarey Eval EP-F, produced by Kuraray Inc.), the adhesive resin composition, and polyethylene (tradename: Mirason, F30EE, produced by Mitsui Nisseki Polymer), a 4 kinds—5 layers laminated film was produced under the following conditions.

Film layer construction: PS (outer layer)/adhesive resin composition/ethylene-vinyl alcohol copolymer (interlayer)/adhesive resin composition/polyethylene (inner layer)=300/50/50/50/300 µm Extruders: 40 mmφ extruder 220° C. (for an outer layer) 30 mmφ extruder 220° C. (for an interlayer) 40 mmφ extruder 220° C. (for an inner layer, for the adhesive layer)

Molding speed: 1 m/min.

In the resulting five-layer film, the interfacial adhesive force (g/15 mm width) between the PS layer or the EVOH layer and the adhesive resin composition layer was measured. The results are shown in Table 1.

Comparative Examples 1 to 3

Example 1 was repeated except that the amounts of the used resin layers were changed as shown in Table 1 to form a five-layered sheet.

The results are shown in Table 1.

What is claimed is:

1. An adhesive resin composition comprising:
   (A) 30 to 70 parts by weight of an ethylene/vinyl acetate copolymer,
   (B) 0 to 50 parts by weight of an unmodified ethylene/α-olefin copolymer having an ethylene content of 30 to 95 mole % and a degree of crystallinity by X-ray of not higher than 40%,
   (C) 10 to 50 parts by weight of a modified ethylene/α-olefin copolymer having a density of 0.850 to 0.900 g/cm³, an ethylene content of 30 to 95 mole % and a degree of crystallinity by X-ray of not higher than 40%,
   (D) 0 to 30 parts by weight of a modified polyethylene having a density of 0.905 to 0.980 g/cm³,
   (E) 1 to 20 parts by weight of a tackifier, and
   (F) 1 to 20 parts by weight of a styrene polymer, (B)+(C)=15 to 60 parts by weight, (C)+(D)≧2 parts by weight, and (A)/((B)+(C))=0.5 to 3.

2. An adhesive resin composition according to claim 1 wherein the ethylene/vinyl acetate copolymer (A) has an ethylene content of 20 to 30% by weight and a melt flow rate measured according to ASTM D1238 (190° C.) of 0.1 to 30 g/10 minutes.

3. An adhesive resin composition according to claim 1 wherein the ethylene/a-olefin copolymer (B) has a melt flow rate measured by ASTM D1238 (190° C.) of 0.1 to 50 g/10 minutes.

4. An adhesive resin composition according to claim 1 wherein the modified ethylene/α-olefin copolymer (C) has a melt flow rate measured by ASTM D1238 (190° C.) of 0.01 to 50 g/10 minutes.

5. An adhesive resin composition according to claim 1 wherein the modified ethylene/α-olefin copolymer (C) is grafted with 0.001 to 10% by weight of an unsaturated carboxylic acid or its derivative.

6. An adhesive resin composition according to claim 1 wherein the modified polyethylene (D) is polyethylene having a degree of crystallinity of at least 50% by weight.

7. An adhesive resin composition according to claim 6 wherein the modified polyethylene (D) has a melt flow rate measured by ASTM D 1238 (190° C.) of 0.01 to 50 g/10 minutes.

8. An adhesive resin composition according to claim 6 wherein the modified polyethylene (D) is grafted with 0.001 to 10% by weight of an unsaturated carboxylic acid or its derivative.

9. A laminated body comprising a styrene resin layer, a layer of saponified ethylene/vinyl acetate copolymer and a

TABLE 1

|  | Example 1 | Example 2 | Example 3 | Example 4 | Example 5 | Comp. Ex. 1 | Comp. Ex. 2 | Comp. Ex. 3 |
|---|---|---|---|---|---|---|---|---|
| EVA | 50 | 40 | 33 | 43 | 38 | 78 | — | 50 |
| EPR | 20 | 20 | 17 | 30 | 30 | — | 85 | 10 |
| MAHEPR | 15 | 20 | 20 | — | — | — | — | — |
| TACK | 10 | 10 | 10 | 10 | 10 | 10 | 10 | 10 |
| MAHLL | — | — | — | 12 | 12 | 12 | 12 | 30 |
| PS | 5 | 10 | 20 | 5 | 10 | — | — | — |
| Adhesive strength (g/15 mm) | | | | | | | | |
| to PS | 800 | 920 | 1100 | 670 | 750 | 610 | 600 | 500 |
| to EVOH | 2700 | 2800 | 2000 | 2100 | 1600 | 290 | 2000 | 1500 | layer of an adhesive resin composition formed between the styrene resin layer and the layer of the saponified ethylene/vinyl acetate copolymer, where the adhesive resin composition comprises:

(A) 30 to 70 parts by weight of an ethylene/vinyl acetate copolymer, (B) 0 to 50 parts by weight of an unmodified ethylene/α-olefin copolymer having an ethylene content of 30 to 95 mole % and a degree of crystallinity by X-ray of not higher than 40%, (C) 10 to 50 parts by weight of a modified ethylene/α-olefin copolymer having a density of 0.850 to 0.900 g/cm$^3$, an ethylene content of 30 to 95 mole % and a degree of crystallinity by X-ray of not higher than 40%, (D) 0 to 30 parts by weight of a modified polyethylene having a density of 0.905 to 0.980 g/cm$^3$, (E) 1 to 20 parts by weight of a tackifier, and (F) 1 to 20 parts by weight of a styrene polymer, in which (B)+(C)=15 to 60 parts by weight, (C)+(D)≧2 parts by weight, and (A)/((B)+(C))=0.5 to 3.

* * * * *

UNITED STATES PATENT AND TRADEMARK OFFICE
CERTIFICATE OF CORRECTION

PATENT NO. : 6,228,504 B1
DATED : May 8, 2001
INVENTOR(S) : Yuji Sawada et al.

It is certified that error appears in the above-identified patent and that said Letters Patent is hereby corrected as shown below:

<u>Title page,</u>
Please delete item "[*] Notice:" in its entirety.

Signed and Sealed this

Twenty-seventh Day of May, 2003

JAMES E. ROGAN
*Director of the United States Patent and Trademark Office*